US011831717B2

(12) United States Patent
Kakinada et al.

(10) Patent No.: US 11,831,717 B2
(45) Date of Patent: Nov. 28, 2023

(54) IP SUPPORT IN NON-CELLULAR LOW-POWER WIDE AREA NETWORKS

(71) Applicant: Charter Communications Operating, LLC, St. Louis, MO (US)

(72) Inventors: Umamaheswar A Kakinada, Carpentersville, IL (US); Wael Guibene, Parker, CO (US); Hossam Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 90 days.

(21) Appl. No.: 17/076,722

(22) Filed: Oct. 21, 2020

(65) Prior Publication Data
US 2022/0124153 A1 Apr. 21, 2022

(51) Int. Cl.
| | |
|---|---|
| H04L 67/12 | (2022.01) |
| H04W 28/06 | (2009.01) |
| H04W 8/26 | (2009.01) |
| H04L 69/166 | (2022.01) |
| H04W 88/16 | (2009.01) |
| H04W 84/18 | (2009.01) |

(52) U.S. Cl.
CPC ............ *H04L 67/12* (2013.01); *H04L 69/166* (2013.01); *H04W 8/26* (2013.01); *H04W 28/06* (2013.01); *H04W 84/18* (2013.01); *H04W 88/16* (2013.01)

(58) Field of Classification Search
CPC ....... H04L 67/12; H04L 69/166; H04L 69/04; H04W 8/26; H04W 28/06; H04W 84/18; H04W 88/16
See application file for complete search history.

(56) References Cited

U.S. PATENT DOCUMENTS

| | | | | |
|---|---|---|---|---|
| 2007/0072611 | A1* | 3/2007 | Feder | H04W 36/005 |
| | | | | 455/436 |
| 2020/0022022 | A1* | 1/2020 | Ly | H04L 69/04 |
| 2020/0137628 | A1* | 4/2020 | Kandasamy | H04L 69/166 |
| 2020/0314632 | A1* | 10/2020 | Fallah | H04W 8/26 |
| 2021/0352046 | A1* | 11/2021 | Huang | H04W 12/088 |

OTHER PUBLICATIONS

Semtech, LoRa and LoRaWan: A Technical Overview. Dec. 2019.*

* cited by examiner

*Primary Examiner* — Mandish K Randhawa
(74) *Attorney, Agent, or Firm* — Mendelsohn Dunleavy, P.C.; Steve Mendelsohn

(57) ABSTRACT

A low-power wide area network supports IP communication between a wireless device and an IP application node. The LPWAN server provides the application node's IP address and a compression/decompression protocol to the device, which applies the protocol (i) to generate a compressed uplink IP header for wireless transmission to LPWAN radio gateway(s), where the compressed IP header is subsequently decompressed to form an uplink IP packet for transmission to the application node and (ii) to decompress a compressed downlink IP header received from a radio gateway, where the compressed IP header was generated from an uncompressed downlink IP header from the IP application node. The device can also segment large uplink IP packets and reassemble large downlink IP packets. In a LoRaWAN network, the join server facilitates arriving at a common compression/decompression protocol and assigns an IP address to the device to enable IP communication with an IP application client.

44 Claims, 4 Drawing Sheets

IP SUPPORT IN NON-CELLULAR LOW-POWER WIDE AREA NETWORKS

BACKGROUND

Field of the Disclosure

The present disclosure relates to communication networks and, more specifically, to non-cellular low-power wide area networks (LPWANs), such as (without limitation) long-range wide area networks (LoRaWANs).

Description of the Related Art

This section introduces aspects that may help facilitate a better understanding of the disclosure. Accordingly, the statements of this section are to be read in this light and are not to be understood as admissions about what is prior art or what is not prior art.

A non-cellular low-power wire area network (LPWAN) is a type of wireless telecommunication wide area network designed to allow long-range communications at a relatively low bit rate among devices/sensors/things/connected objects typically powered by a battery. The low power, low bit rate, and intended use distinguish this type of network from a wireless WAN that is designed to connect higher-power devices intended to carry more data. The LPWAN data rate is less than about 50 kbits/s per channel and typically ranges from about 0.3 kbits/s to about 50 kbits/s per channel.

A long-range wide area network (LoRaWAN) is a particular type of non-cellular LPWAN network that conforms to the LoRaWAN specifications, the teachings of which are incorporated herein by reference in their entirety.

FIG. 1 is a block diagram of a conventional LoRaWAN network 100. As shown in FIG. 1, the LoRaWAN network 100 has a network server 106, a join server 108, and a number of radio gateways 104. The radio gateways 104 are capable of communicating wirelessly with one or more different wireless devices 102, and the network server 106 is capable of communicating with one or more different application servers 110, each of which is capable of communicating with one or more different application clients 112. The join server 108 is responsible for assigning network and application session keys, where (i) the network session keys are used to provide packet integrity protection between the wireless devices 102 and the network server 106 and (ii) the application session keys are used to provide payload ciphering between the wireless devices 102 and the application servers 110.

According to the LoRaWAN specifications, the size of the payload in a wireless LoRaWAN data packet (referred to herein as a "LoRaWAN PHY-layer packet") can be anywhere from 11 bytes to 242 bytes, where the maximum payload size for a given communication session depends on the received signal strengths of the radio signals transmitted between the wireless device and the "strongest" radio gateway, with stronger radio signals enabling larger payloads.

SUMMARY

The minimum size of the header in an Internet Protocol (IP) data packet is 20 bytes, and the maximum size is 60 bytes, with 20-byte headers for IPv4 packets being most common. Assume, for example, that, due to the current radio signal strengths, a wireless device 102 in the LoRaWAN network 100 of FIG. 1 is able to transmit and receive LoRaWAN PHY-layer packets having a payload length of only 30 bytes (i.e., not counting the LoRaWAN PHY-layer header). Assume further that the IP packet header for a particular IP application has a length of 20 bytes. In order for that wireless device 102 to be able to support IP communication with an application client 112 of FIG. 1 running that IP application, the data portion of the IP packets for that IP communication would be limited to 10 bytes per packet, because the 20-byte IP packet header would require all but 10 bytes of the available 30-byte LoRaWAN PHY-layer payload. This low data rate can severely limit the practicality and even the feasibility of having LoRaWAN wireless devices communicate with IP application clients. The situation will be even worse for smaller LoRaWAN PHY-layer payload sizes (the minimum of which is 11 bytes) and/or larger IP header sizes (the maximum of which is 60 bytes).

Note that there are two different IP layers: (i) a LoRaWAN IP layer for transmitting LoRaWAN IP-layer packets between the radio gateways and the application servers and (ii) a data network (DN) IP layer for transmitting DN IP-layer packets between the application servers and the application clients, where the application servers and application clients are part of a data network, such as (without limitation) the Internet.

In order to improve the ability of a LoRaWAN wireless device to communicate effectively and efficiently with an IP application client, according to the present disclosure, an "IP-friendly" wireless device applies a compression/decompression protocol to the DN IP-layer packet header of an uplink DN IP-layer packet to generate a compressed (i.e., smaller) DN IP-layer packet header that is transmitted as part of the payload of an uplink LoRaWAN PHY-layer packet towards the application server associated with that IP application client. (Note that each receiving LoRaWAN radio gateway will (i) convert the uplink LoRaWAN PHY-layer packet into an uplink LoRaWAN IP-layer packet (having the compressed DN IP-layer packet header as part of its payload) and (ii) send that uplink LoRaWAN IP-layer packet to the network server, which will de-duplicate multiple copies of the uplink LoRaWAN IP-layer packets received from multiple different LoRaWAN radio gateways and forward only one copy of each different uplink LoRaWAN IP-layer packet to the application server.) The application server applies that same compression/decompression protocol to the compressed DN IP-layer packet header in the payload of the received uplink LoRaWAN IP-layer packet to reconstruct the original uplink DN IP-layer packet, which is then routed to the IP application client.

Analogously, when the application server receives a downlink DN IP-layer packet from the IP application client destined for that same IP-friendly wireless device, the application server applies the same or a different compression/decompression protocol to the header of that downlink DN IP-layer packet to generate a compressed DN IP-layer packet header that is transmitted as part of a downlink LoRaWAN IP-layer packet towards the IP-friendly wireless device. (Note that the network server will forward the downlink LoRaWAN IP-layer packet to the particular radio gateway that the network server selects as the "best" radio gateway for communicating with the wireless device, where that radio gateway will convert the downlink LoRaWAN IP-layer packet into a downlink LoRaWAN PHY-layer packet for wireless transmission to the IP-friendly wireless device.) The IP-friendly wireless device applies that same compression/decompression protocol to the compressed DN IP-layer packet header in the payload of the received downlink LoRaWAN PHY-layer packet to reconstruct the original downlink DN IP-layer packet.

Assume, for example, the same situation as before with a 30-byte LoRaWAN PHY-layer payload and a 20-byte DN IP-layer header. If the compression/decompression protocol can generate a compressed DN IP-layer header of only 3 bytes, then there will be 27 bytes of LoRaWAN PHY-layer payload available for DN IP-layer data instead of only 10 bytes, thereby greatly improving the ability of the IP-friendly wireless device to communicate with an IP application client via the LoRaWAN network.

In addition to compressing DN IP-layer packet headers, the IP-friendly wireless devices and the application servers are able to divide large DN IP-layer packets into multiple smaller LoRaWAN packets as needed, where the maximum size of the LoRaWAN packets is dictated by the strength of the radio signaling between the wireless devices and the radio gateways as manifested in a specified maximum segment size.

According to certain embodiments of the disclosure, the join server of the LoRaWAN network is responsible for providing the IP addresses of the IP-friendly wireless devices to the appropriate application servers, providing the IP addresses of the IP application clients to the appropriate IP-friendly wireless devices, and assigning the selected compression/decompression protocols, protocol profiles, and maximum segment sizes to the IP-friendly wireless devices and the application servers. In some embodiments in which the wireless devices do not have pre-configured IP addresses, the LoRaWAN join server also assigns IP addresses to the IP-friendly wireless devices.

In general, the use of compression/decompression algorithms to compress DN IP-layer packet headers can be applied in an analogous manner in non-cellular LPWAN networks other than LoRaWAN networks, including (without limitation) ZigBee R23 star topology networks, Weightless networks, 802.11ah (sub-GHz WiFi) networks, Random Phase Multiple Access (RPMA) networks, 802.15.4G networks, and Massive Internet of Things (MIOTY) networks.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
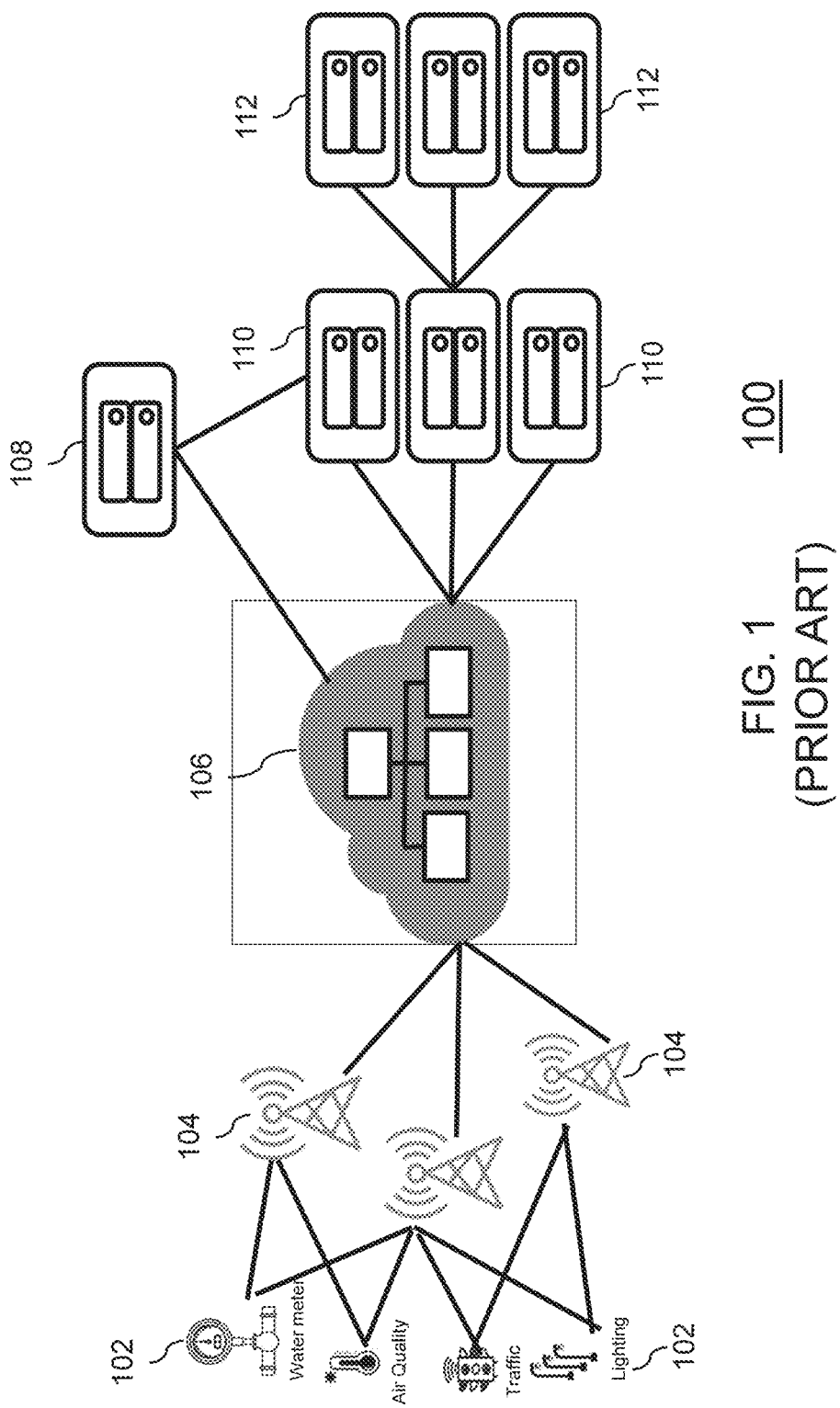
FIG. 1 is a block diagram of a conventional LoRaWAN network.
Figure 2:
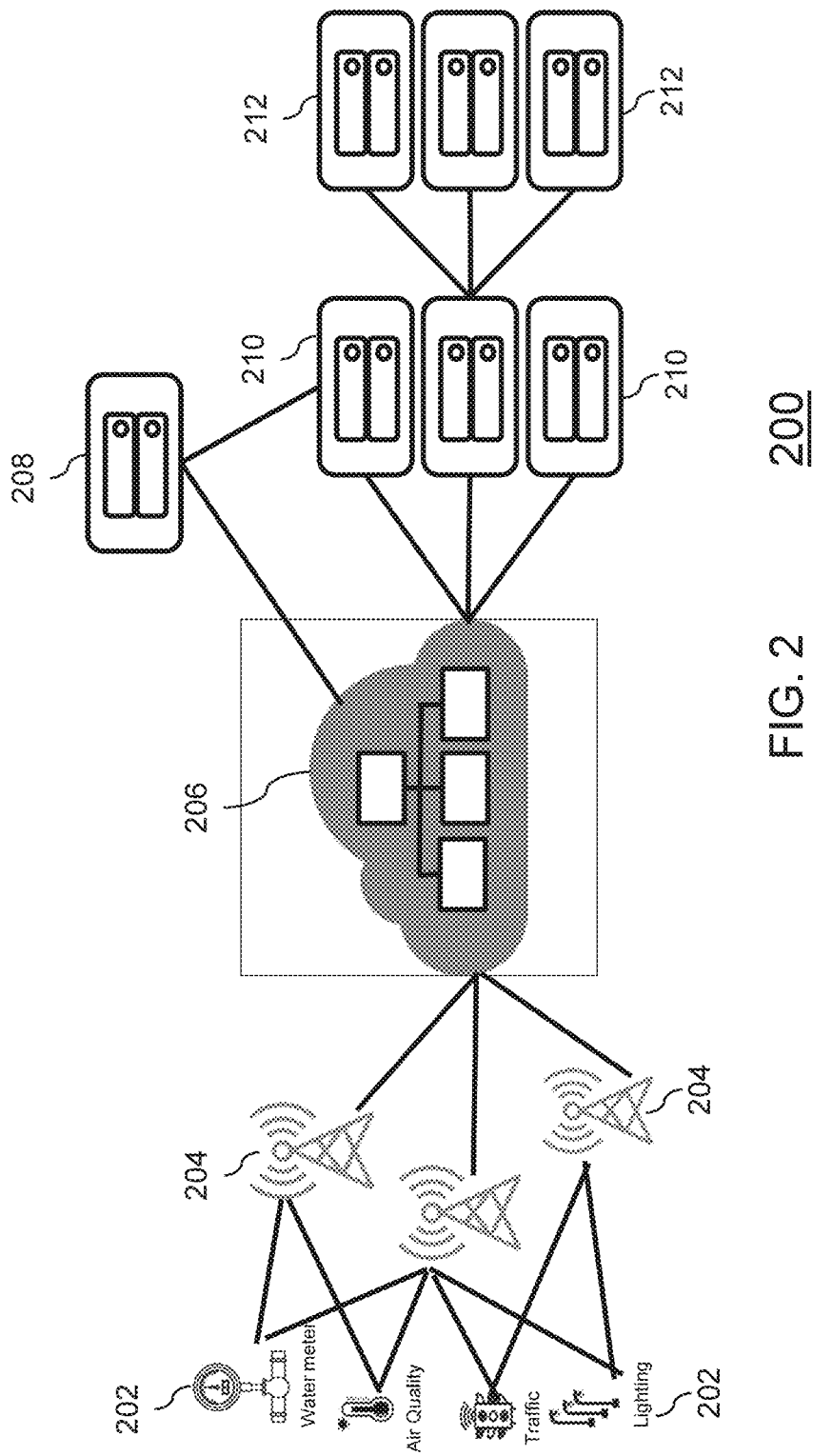
FIG. 2 is a block diagram of a LoRaWAN network according to one embodiment of the disclosure.

FIG. 2 is a block diagram of a LoRaWAN network 200 according to one embodiment of the disclosure. The LoRaWAN network 200 is similar to the conventional LoRaWAN network 100 of FIG. 1 with similar elements having analogous labels, except that the LoRaWAN network 200 is modified to support IP communication sessions between one or more IP-friendly wireless devices 202 and one or more IP application clients 212 that execute suitable IP applications. In certain implementations, as explained further below, the join server 208 is modified to be different from the conventional join server 108 of FIG. 1, while the radio gateways 204 and the network server 206 are identical to the conventional radio gateways 104 and the conventional network server 106 of FIG. 1, respectively, where the radio gateways 204 and the network server 206 are unaware of the IP communications. Note that, in certain implementations, the LoRaWAN network 200 is backwards compatible such that legacy wireless devices like the wireless devices 102 of FIG. 1 are still able to communicate with legacy application clients like the application clients 112 of FIG. 1 via legacy application servers like the application servers 110 of the LoRaWAN network 200. Depending on the implementation, the network server 206 and the join server 208 may be remotely located from each other or co-located including possibly implemented by the same processor.

Like the join server 108 of FIG. 1, the join server 208 is responsible for assigning network and application session keys for packet integrity protection and payload ciphering. In addition the join server 208 is responsible for ensuring that the one or more IP-friendly wireless devices 202 and the one or more application servers 210 have the information that they need to generate and handle IP-friendly LoRaWAN data packets to enable the IP-friendly wireless devices 202 to participate in efficient IP communication sessions with the IP application clients 212. In particular, each IP-friendly wireless device 202 is able to generate and wirelessly transmit, to the radio gateways 204, uplink LoRaWAN PHY-layer packets having compressed uplink DN IP-layer headers in their payloads, and the corresponding application server 210 is able to decompress the compressed uplink DN IP-layer headers in the payloads of the corresponding LoRaWAN IP-layer packets received from the network server 206 to generate uplink DN IP-layer packets for transmission to the appropriate IP application client 212. Analogously, each corresponding application server 206 is able to generate and forward downlink LoRaWAN IP-layer packets having compressed downlink DN IP-layer headers in their payloads to the network server 206, and the IP-friendly wireless device 202 is able to decompress the compressed downlink DN IP-layer headers in the payloads of the corresponding LoRaWAN PHY-layer packets received from a selected radio gateway 204.

For a particular IP communication session between a particular IP-friendly wireless device 202 and a particular IP application client 212, the needed information includes:
- The IP address of the IP-friendly wireless device 202;
- The IP address of the IP application client 212;
- The compression/decompression protocol to be used by the IP-friendly wireless device 202 to generate the compressed uplink DN IP-layer headers and by the application server 210 associated with the IP application client 212 to decompress those compressed uplink DN IP-layer headers;
- The compression/decompression protocol to be used by the application server 210 to generate compressed downlink DN IP-layer headers and by the IP-friendly wireless device 202 to decompress those compressed downlink IP-layer headers; and
- The maximum segment size to be used in dividing large IP packets into multiple smaller LoRaWAN packets.

For the rest of this discussion, it will be assumed that the same compression/decompression protocol is used for both uplink and downlink packets, but those skilled in the art will understand that different protocols could be used.

Those skilled in the art will also understand that the compression/decompression protocol could be any suitable protocol for compressing IP packet headers, such as (without limitation) the Robust Header Compression Protocol (RoHC), the Compression Control Protocol (CCP), or any other suitable compression protocol. In some embodiments, the IP-friendly wireless devices 202 and the application servers 210 are capable of performing any one of two or more different compression/decompression protocols. In these embodiments, the join server 208 is responsible for instructing the IP-friendly wireless devices 202 and the corresponding application servers 210 which protocols and which protocol profiles to use for different IP communication sessions.

The maximum segment size is based on the maximum payload that can be sent from the IP-friendly wireless device 202 to the application server 210 or from the application server 210 to the IP-friendly wireless device 202. Note that the uplink maximum segment size may be different from the downlink maximum segment size. A segmentation function in each of the IP-friendly wireless device 202 and the application server 210 takes the appropriate maximum segment size into account to create segments of appropriate size to send at a given time. Each maximum segment size is based on the current radio characteristics. The IP-friendly wireless device 202 derives the uplink maximum segment size based on the Spreading Factor (SF) used. The application server 210 determines the downlink maximum segment size based on information received from the network server 206 about the current radio characteristics.

In some embodiments, the IP-friendly wireless devices 202 are pre-configured with IP addresses, while, in other embodiments, they are not. In those latter embodiments, the join server 208 is responsible for assigning IP addresses to the IP-friendly wireless devices 202.

Figure 3:
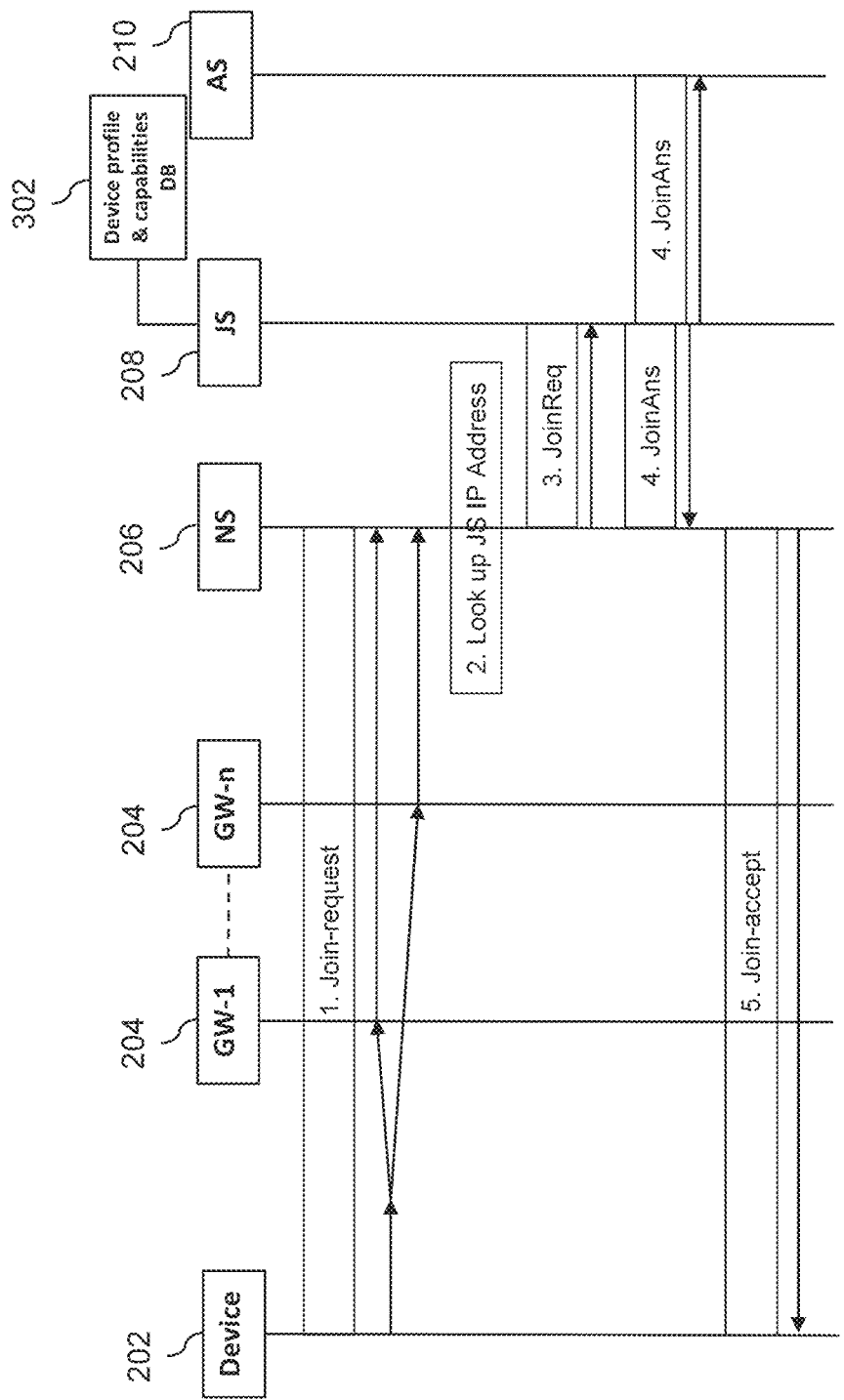
FIG. 3 is a flow diagram of the messaging performed in the LoRaWAN network of FIG. 2 to establish an IP-friendly wireless device-initiated IP communication session.

FIG. 3 is a flow diagram of the messaging performed in the LoRaWAN network 200 of FIG. 2 to establish an IP-friendly wireless device-initiated IP communication session between a particular IP-friendly wireless device 202 and a particular IP application client 212 (not explicitly shown in FIG. 3). In certain implementations, the messaging relies on existing LoRaWAN message types as defined in the existing LoRaWAN standards by employing the optional attributes defined for those LoRaWAN message types, where suitable Tag-Length-Value (TLV) formatting is used to convey attribute information.

In Step 1, the IP-friendly wireless device 202 transmits to the network server 206 a LoRaWAN Join-request message which functions as an IP access request for an IP communication session with the IP application client 212, where one or more copies of the Join-request message may reach the network server 206 via one or more different radio gateways 204. The Join-request message indicates the capability and the desire of the IP-friendly wireless device 202 to support an IP communication session.

In Step 2, the network server 206 looks up the IP address of the join server 208 associated with the IP-friendly wireless device 202. In some implementations, the LoRaWAN network 200 may have multiple join servers 208, in which case, the network server 206 must identify the particular join server 208 that is responsible for servicing the IP-friendly wireless device 202 that transmitted the Join-request message.

In Step 3, the network server 206 sends a LoRaWAN JoinReq message to the join server 208. In some implementations, the SenderToken attribute of the LoRaWAN JoinReq message is used to identify the IP capabilities of the IP-friendly wireless device 202 (e.g., the IP transport protocol supported such as (without limitation) IP/TCP or IP/UDP), the compression/decompression protocols supported by the IP-friendly wireless device 202, and a set of profiles and dictionaries supported by the IP-friendly wireless device 202 for each compression/decompression protocol. In other implementations, some or all of that information is pre-configured in a device profile and capabilities database 302. In that latter case, in Step 3, the join server 208 accesses the database 302 to retrieve information about the IP-friendly wireless device 202 and selects a compression/decompression protocol and a compression/decompression profile and dictionary for the selected protocol.

In some implementations, the IP-friendly wireless device 202 has a pre-configured IP address. In other implementations, the IP-friendly wireless device 202 does not have a pre-configured IP address, in which case, the join server 208 assigns an IP address to the IP-friendly wireless device 202 for the requested IP communication session.

In Step 4, as needed, using the ReceiverToken attribute, the join server 208 sends LoRaWAN JoinAns messages to both the network server 206 and the application server 210 corresponding to the IP application client 212 with which the IP-friendly wireless device 202 is to communicate to ensure that the IP-friendly wireless device 202 and the application server 210 both have the following information:
- An indication that the IP access request is being honored (if the IP access request is denied, then the join server 208 will send a negative JoinAns message to the network server 206 and nothing to the application server 210);
- The IP address of the IP-friendly wireless device 202;
- The IP address of the IP application client 212;
- Identification of the selected compression/decompression protocol;
- Identification of the selected compression/decompression profile; and
- Identification of the selected compression/decompression dictionary.

In Step 5, the network server 206 sends a LoRaWAN Join-accept message with the appropriate information to the IP-friendly wireless device 202.

After the processing of FIG. 3 is completed, the IP-friendly wireless device 202 will be able to generate and transmit uplink LoRaWAN PHY-layer packets having compressed DN IP-layer packet headers that the application server 210 will be able to decompress to reconstruct uplink DN IP-layer packets to send to the IP application client 212. In addition, the application server 210 will be able to receive downlink DN IP-layer packets from the IP application client 212, compress the DN IP-layer packet headers to form downlink LoRaWAN IP-layer packets that are forwarded to the selected radio gateway 204, which forms corresponding downlink LoRaWAN PHY-layer packets for wireless transmission to the IP-friendly wireless device 202, which will be able to decompress the compressed DN IP-layer packet headers. Those skilled in the art will understand that there is an analogous sequence of messaging for an IP application client-originated request for an IP communication session with a particular IP-friendly wireless device 202.

Figure 4:
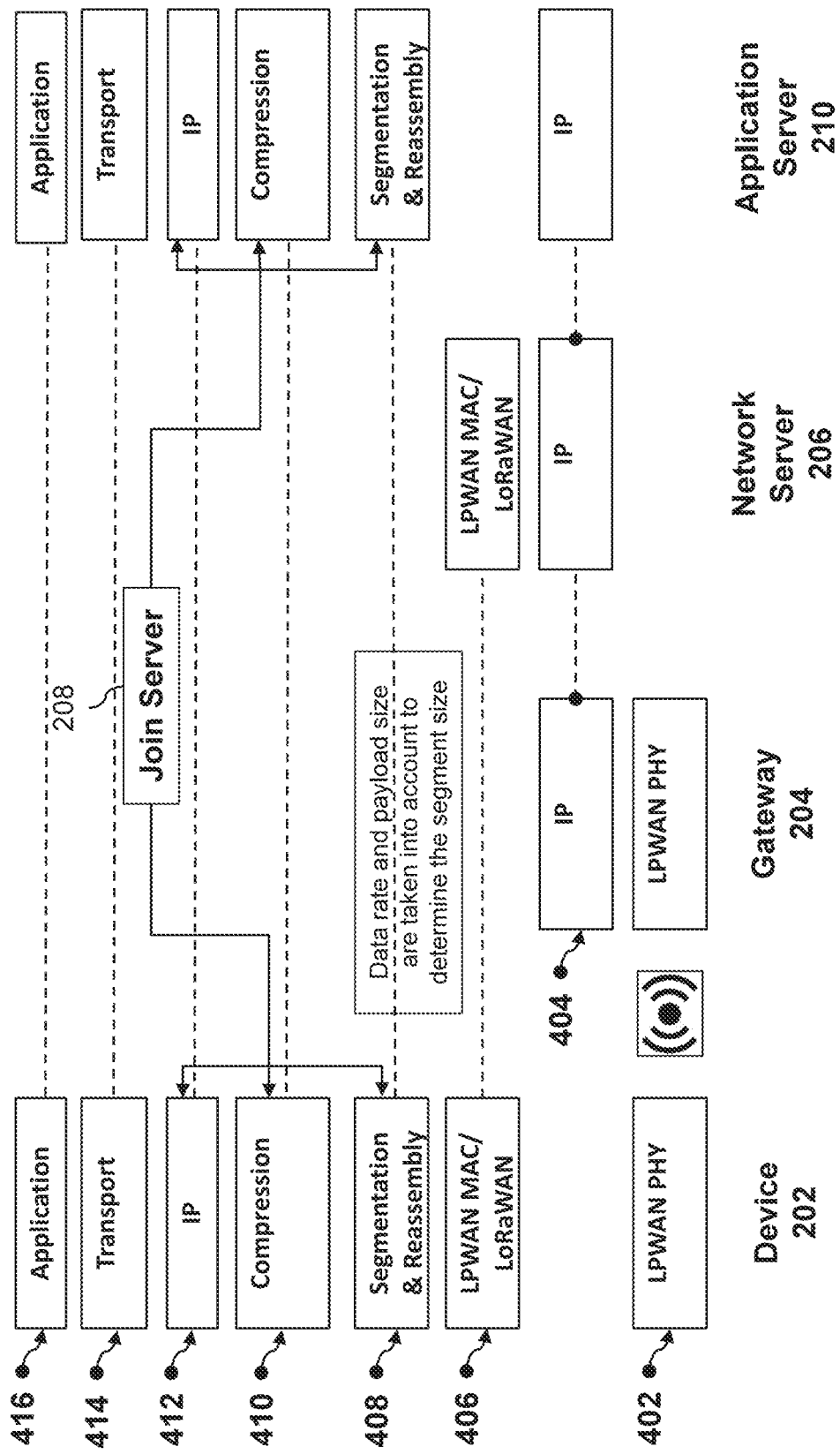
FIG. 4 is a representation of the protocol stacks for the IP-friendly wireless device, the radio gateways, the network server, and the application servers of the LoRaWAN network of FIG. 2 according to one possible implementation.

FIG. 4 is a representation of the protocol stacks for the IP-friendly wireless devices 202, the radio gateways 204, the network server 206, and the application servers 210 of the LoRaWAN network 200 of FIG. 2 according to one possible implementation.

The LPWAN PHY layer 402 represents the wireless transmission of LoRaWAN PHY-layer packets between the IP-friendly wireless devices 202 and the radio gateways 204.

The LoRaWAN IP layer 404 represents the IP transmission of LoRaWAN IP-layer packets between the radio gateways 204, the network server 206, and the application servers 210.

The LPWAN MAC/LoRaWAN layer 406 forms the basis of connectivity between the IP-friendly wireless devices 202 and the radio gateways 204.

The Segmentation and Reassembly layer 408 represents (i) the processing in the IP-friendly wireless devices 202 and in the application servers 210 to divide large IP packets into two or more small-enough segments for transmission in LoRaWAN PHY-layer packets (i.e., segmentation) and (ii) the reciprocal processing in the application servers 210 and in the IP-friendly wireless devices 202 to reconstruct the original IP packets from the two or more segments (i.e., reassembly).

The Compression layer 410 represents (i) the processing in the IP-friendly wireless devices 202 and in the application servers 210 to compress DN IP-layer packet headers and (ii) the reciprocal processing in the application servers 210 and in the IP-friendly wireless devices 202 to decompress the compressed DN IP-layer packet headers. Note that, in this implementation, IP header compression is performed before segmentation and therefore reassembly is performed before IP header decompression. In other possible implementations, that ordering is reversed.

The IP layer 412 represents the IP-layer processing of the DN IP-layer packets by the IP-friendly wireless devices 202 and by the application servers 210.

As represented in FIG. 4, in certain implementations, the join server 208 is responsible for distributing information that enables the processing at the Segmentation and Reassembly layer 408, the Compression layer 410, and the IP layer 412.

The Transport layer 414 represents the processing of the IP packets at the IP-friendly wireless devices 202 and at the application servers 210 to include the IP-layer payloads into outgoing IP-layer packets and to extract IP-layer payloads from incoming IP-layer packets.

The Application layer 416 represents the application-level processing of the data contained in the IP-layer packet payloads at the IP-friendly wireless devices 202 and at the application servers 210.

Embodiments of this disclosure have been described in the context of the LoRaWAN network 200 of FIG. 2 having multiple LoRaWAN radio gateways 204, a LoRaWAN network server 206, and a LoRaWAN join server 208, where the LoRaWAN network 200 supports IP communication sessions between IP-friendly wireless devices 202 and IP application clients 212 of application servers 210 connected to the LoRaWAN network server 206. In general, embodiments of this disclosure can be implemented in the context of any suitable non-cellular LPWAN network having one or more LPWAN radio gateways and an LPWAN network server, where the non-cellular LPWAN network supports IP communication sessions between at least one IP-friendly wireless device and at least one node running an IP application. At minimum, in such a generic non-cellular LPWAN network, an IP-friendly wireless device is capable of compressing the header of an uplink IP packet for wireless transmission of the compressed IP packet header, where the compressed IP packet header will be subsequently decompressed to re-cover the original uplink IP packet for transmission to the IP application node. Analogously, at minimum, the header of a downlink IP packet generated by the IP application node will be compressed for wireless transmission to the IP-friendly wireless device, which will decompress the compressed IP packet header to re-cover the original downlink IP packet. Depending on the particular embodiment, other features such as selection of compression/decompression protocols, protocol profiles, and/or maximum segment sizes may also be supported by the non-cellular LPWAN network. When the LPWAN network is the LoRaWAN network 200 of FIG. 2, the LPWAN network server is implemented as the combination of the LoRaWAN network server 206 and the LoRaWAN join server 208, and the node running the IP application is an IP application client 212 that communicates with the LoRaWAN network server 206 via an application server 210.

In certain embodiments, the present disclosure is a non-cellular low-power wide area network (LPWAN) for supporting Internet protocol (IP) communication between a wireless device and an IP application node having an IP address. The LPWAN network comprises one or more LPWAN radio gateways capable of wirelessly communicating with the wireless device and an LPWAN server connected to the one or more LPWAN radio gateways and capable of communicating with the IP application node. The LPWAN server is capable of (i) providing the IP address of the IP application node to the wireless device; (ii) assigning an uplink (UL) compression/decompression protocol to the wireless device to enable the wireless device to apply the UL compression/decompression protocol to a UL IP header to generate a compressed UL IP header for wireless transmission from the wireless device to at least one LPWAN radio gateway, wherein the compressed UL IP header is subsequently decompressed to form a UL IP packet for transmission to the IP application node, thereby enabling the wireless device to transmit UL data to the IP application node via the LPWAN network; and (iii) assigning a downlink (DL) compression/decompression protocol to the wireless device to enable the wireless device to apply the DL compression/decompression protocol to decompress a compressed DL IP header received via wireless transmission from at least one LPWAN radio gateway, wherein the compressed DL IP header was previously generated from an uncompressed DL IP header of a DL IP packet from the IP application node, thereby enabling the wireless device to receive DL data from the IP application node via the LPWAN network.

In at least some of the above embodiments, the IP application node is an IP application client of an application server that is connected between the LPWAN server and the IP application client. The LPWAN server is capable of (i) providing an IP address of the wireless device to the application server; (ii) assigning the UL compression/decompression protocol to the application server to enable the application server to decompress the compressed UL IP header to form the UL IP packet for transmission to the IP application client; and (iii) assigning the DL compression/decompression protocol to the application server to enable the application server to generate the compressed DL IP header from the uncompressed DL IP header of the DL IP packet from the IP application node.

In at least some of the above embodiments, the LPWAN network is a Low-Power Wide Area Network (LoRaWAN); each LPWAN radio gateway is a LoRaWAN radio gateway; the LPWAN server comprises a LoRaWAN network server and a LoRaWAN join server; the LoRaWAN network server is connected to each LoRaWAN radio gateway and capable of communicating with the application server; and the LoRaWAN join server is connected to the LoRaWAN network server and capable of (i) facilitating in arriving at a common compression/decompression protocol, profile, and dictionary for the wireless device and the application server and (ii) assigning an IP address to the wireless device to enable the wireless device to communicate with the IP application client.

In at least some of the above embodiments, the UL compression/decompression protocol is the same as the DL compression/decompression protocol.

In at least some of the above embodiments, the LPWAN server assigns an IP address of the wireless device to the wireless device.

In at least some of the above embodiments, the LPWAN server enables one or more legacy wireless devices to communicate with one or more legacy application nodes.

In other embodiments, the present disclosure is any of the above-described wireless devices.

In at least some of the above embodiments, the wireless device is capable of determining a maximum segment size to enable the wireless device to segment relatively large IP packets into multiple, relatively small LPWAN packets.

In at least some of the above embodiments, the LPWAN network is a LoRaWAN network comprising one or more LoRaWAN radio gateways, a LoRaWAN network server, and a LoRaWAN join server; the IP application node is an IP application client of an application server that is connected between the LoRaWAN network server and the IP application client; the LoRaWAN network server is connected to each LoRaWAN radio gateways and capable of communicating with the application server; and the LoRaWAN join server is connected to the LoRaWAN network server and capable of assigning the UL and DL compression/decompression protocols to the wireless device.

In still other embodiments, the present disclosure is an application server for a non-cellular LPWAN network for supporting IP communication between the wireless device and an IP application client of the application server, the IP application client having an IP address. The application server is capable of (i) receiving a UL LPWAN packet from the LPWAN network, wherein the UL LPWAN packet comprises a compressed IP packet header; (ii) applying a UL compression/decompression protocol to decompress the compressed IP packet header to generate an UL IP packet for transmission to the IP application client, thereby enabling the wireless device to transmit UL data to the IP application node via the LPWAN network; (iii) receiving a DL IP packet from the IP application client; (iv) applying a DL compression/decompression protocol to an IP packet header of the downlink IP packet to generate a compressed IP packet header; and (v) transmitting the compressed IP packet header to the LPWAN network for wireless transmission of the compressed IP packet header to the wireless device, which applies the DL compression/decompression protocol to decompress the compressed IP packet header to recover the DL IP packet, thereby enabling the wireless device to receive DL data from the IP application node via the LPWAN network.

In at least some of the above embodiments, the application server is capable of (i) receiving an IP address of the wireless device from the LPWAN network and (ii) being assigned the UL and DL compression/decompression protocols by the LPWAN network.

In at least some of the above embodiments, the LPWAN network is a LoRaWAN network comprising one or more LoRaWAN radio gateways, a LoRaWAN network server, and a LoRaWAN join server; the LoRaWAN network server is connected to each LoRaWAN radio gateway and capable of communicating with the application server; and the LoRaWAN join server is connected to the LoRaWAN network server and capable of (i) facilitating in arriving at a common compression/decompression protocol, profile, and dictionary for the application server and (ii) assigning an IP address to the wireless device to enable the wireless device to communicate with the IP application client.

In at least some of the above embodiments, the UL compression/decompression protocol is the same as the DL compression/decompression protocol.

In at least some of the above embodiments, the application server is capable of determining a maximum segment size to enable the application server to segment relatively large IP packets into multiple, relatively small LPWAN packets.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A non-cellular low-power wide area network (LPWAN) for supporting Internet protocol (IP) communication between a wireless device and an IP application node having an IP address, the LPWAN network comprising:
   one or more LPWAN radio gateways that wirelessly communicate with the wireless device;
   an LPWAN server connected to the one or more LPWAN radio gateways and that communicates with the IP application node, wherein the LPWAN server:
   provides the IP address of the IP application node to the wireless device;
   selects an uplink (UL) compression/decompression protocol from a plurality of available UL compression/decompression protocols and assigns the selected UL compression/decompression protocol and a corresponding UL protocol profile to the wireless device to enable the wireless device to apply the UL compression/decompression protocol to a UL IP-layer header to generate a compressed UL IP-layer header for wireless transmission from the wireless device to at least one LPWAN radio gateway, wherein the compressed UL IP-layer header is subsequently decompressed to form a UL IP packet for transmission to the IP application node, wherein the LPWAN network transmits UL data from the wireless device to the IP application node; and
   selects a downlink (DL) compression/decompression protocol from a plurality of available DL compression/decompression protocols and assigns the selected DL compression/decompression protocol and a corresponding DL protocol profile to the wireless device to enable the wireless device to apply the DL compression/decompression protocol to decompress a compressed DL IP-layer header received via wireless transmission from at least one LPWAN radio gateway, wherein the compressed DL IP-layer header was previously generated from an uncompressed DL IP-layer header of a DL IP packet from the IP application node, wherein the LPWAN network transmits DL data from the IP application node to the wireless device, wherein:
   the wireless device is capable of supporting any of the plurality of available UL compression/decompression protocols and any of the plurality of available DL compression/decompression protocols;
   the LPWAN server selects both (i) the selected UL compression/decompression protocol from the plurality of available UL compression/decompression protocols and (ii) the selected DL compression/decompression protocol from the plurality of available DL compression/decompression protocols based on IP capabilities of the wireless device; and
   the UL compression/decompression protocol is different from the DL compression/decompression protocol.

2. The LPWAN network of claim 1, wherein:
   the IP application node is an IP application client of an application server that is connected between the LPWAN server and the IP application client; and
   the LPWAN server:
   provides an IP address of the wireless device to the application server;
   assigns the UL compression/decompression protocol to the application server to enable the application server to decompress the compressed UL IP-layer header to form the UL IP packet for transmission to the IP application client; and
   assigns the DL compression/decompression protocol to the application server to enable the application server to generate the compressed DL IP-layer header from the uncompressed DL IP-layer header of the DL IP packet from the IP application node.

3. The LPWAN network of claim 2, wherein:
   the LPWAN network is a Low-Power Wide Area Network (LoRaWAN);
   each LPWAN radio gateway is a LoRaWAN radio gateway;
   the LPWAN server comprises a LoRaWAN network server and a LoRaWAN join server;
   the LoRaWAN network server is connected to each LoRaWAN radio gateway and communicates with the application server; and
   the LoRaWAN join server is connected to the LoRaWAN network server and (i) facilitates in arriving at a common compression/decompression protocol, profile, and dictionary for the wireless device and the application server and (ii) assigns an IP address to the wireless device to enable the wireless device to communicate with the IP application client.

4. The LPWAN network of claim 1, wherein the LPWAN server assigns an IP address of the wireless device to the wireless device.

5. The LPWAN network of claim 1, wherein the LPWAN server enables one or more legacy wireless devices to communicate with one or more legacy application nodes.

6. The LPWAN network of claim 1, wherein the IP capabilities of the wireless device are pre-configured in a device profile and capabilities database stored in the LPWAN server.

7. The LPWAN network of claim 1, wherein the IP capabilities of the wireless device are included in a join-request message received by the LPWAN server from the wireless device.

8. The LPWAN network of claim 1, wherein:
   the plurality of available UL compression/decompression protocols comprises at least Robust Header Compression Protocol (RoHC) and Compression Control Protocol (CCP); and
   the plurality of available DL compression/decompression protocols comprises at least RoHC and CCP.

9. A wireless device for a non-cellular LPWAN network for supporting IP communication between the wireless device and an IP application node having an IP address, the wireless device:
- wirelessly communicates with the LPWAN network;
- receives assignment of a selected UL compression/decompression protocol and a corresponding UL protocol profile from an LPWAN server of the LPWAN network and applies the selected UL compression/decompression protocol and the corresponding UL protocol profile to a UL IP-layer header to generate a compressed UL IP-layer header for wireless transmission from the wireless device to the LPWAN network, wherein the compressed UL IP-layer header is subsequently decompressed to form a UL IP packet for transmission to the IP application node, wherein the wireless device transmit UL datas to the IP application node via the LPWAN network; and
- receives assignment of a selected DL compression/decompression protocol and a corresponding DL protocol profile from the LPWAN server and applies the selected DL compression/decompression protocol and the corresponding DL protocol profile to decompress a compressed DL IP-layer header received via wireless transmission from the LPWAN network, wherein the compressed DL IP-layer header was previously generated from an uncompressed DL IP-layer header of a DL IP packet from the IP application node, wherein the wireless device receives DL data from the IP application node via the LPWAN network, wherein:
  - the wireless device is capable of supporting any of the plurality of available UL compression/decompression protocols and any of the plurality of available DL compression/decompression protocols;
  - the LPWAN server selects both (i) the selected UL compression/decompression protocol from the plurality of available UL compression/decompression protocols and (ii) the selected DL compression/decompression protocol from the plurality of available DL compression/decompression protocols based on IP capabilities of the wireless device; and
  - the UL compression/decompression protocol is different from the DL compression/decompression protocol.

10. The wireless device of claim 9, wherein:
- the LPWAN network is a LoRaWAN network comprising one or more LoRaWAN radio gateways, a LoRaWAN network server, and a LoRaWAN join server;
- the IP application node is an IP application client of an application server that is connected between the LoRaWAN network server and the IP application client;
- the LoRaWAN network server is connected to each LoRaWAN radio gateways and communicates with the application server; and
- the LoRaWAN join server is connected to the LoRaWAN network server and (i) facilitates in arriving at a common compression/decompression protocol, profile, and dictionary for the wireless device and (ii) assigns an IP address to the wireless device to enable the wireless device to communicate with the IP application client.

11. The wireless device of claim 9, wherein the wireless device receives assignment of an IP address of the wireless device from the LPWAN network.

12. The wireless device of claim 9, wherein the wireless device determines a maximum segment size to enable the wireless device to segment relatively large IP packets into multiple, relatively small LPWAN packets.

13. The wireless device of claim 9, wherein the IP capabilities of the wireless device are pre-configured in a device profile and capabilities database stored in the LPWAN server.

14. The wireless device of claim 9, wherein the IP capabilities of the wireless device are included in a join-request message transmitted from the wireless device to the LPWAN server.

15. The wireless device of claim 9, wherein:
- the plurality of available UL compression/decompression protocols comprises at least Robust Header Compression Protocol (RoHC) and Compression Control Protocol (CCP); and
- the plurality of available DL compression/decompression protocols comprises at least RoHC and CCP.

16. An application server for a non-cellular LPWAN network for supporting IP communication between a wireless device and an IP application client of the application server, the IP application client having an IP address, wherein the application server:
- receives a UL LPWAN packet from the LPWAN network, wherein the UL LPWAN packet comprises a compressed IP packet header;
- receives assignment of a selected UL compression/decompression protocol and a corresponding UL protocol profile from an LPWAN server of the LPWAN network and applies the selected UL compression/decompression protocol and the corresponding UL protocol profile to decompress the compressed IP packet header to generate an UL IP packet for transmission to the IP application client, wherein the IP application node receives UL data from the wireless device via the LPWAN network;
- receives a DL IP packet from the IP application client;
- receives assignment of a selected DL compression/decompression protocol and a corresponding DL protocol profile from the LPWAN server and applies the selected DL compression/decompression protocol and the corresponding DL protocol profile to an IP packet header of the downlink IP packet to generate a compressed IP packet header; and
- transmits the compressed IP packet header to the LPWAN network for wireless transmission of the compressed IP packet header to the wireless device, which applies the DL compression/decompression protocol to decompress the compressed IP packet header to recover the DL IP packet, wherein the IP application node transmits DL data to the wireless device via the LPWAN network, wherein:
  - the wireless device is capable of supporting any of the plurality of available UL compression/decompression protocols and any of the plurality of available DL compression/decompression protocols;
  - the LPWAN server selects both (i) the selected UL compression/decompression protocol from the plurality of available UL compression/decompression protocols and (ii) the selected DL compression/decompression protocol from the plurality of available DL compression/decompression protocols based on IP capabilities of the wireless device; and
  - the UL compression/decompression protocol is different from the DL compression/decompression protocol.

17. The application server of claim 16, wherein the application server receives an IP address of the wireless device from the LPWAN network.

18. The application server of claim 17, wherein:
the LPWAN network is a LoRaWAN network comprising one or more LoRaWAN radio gateways, a LoRaWAN network server, and a LoRaWAN join server;
the LoRaWAN network server is connected to each LoRaWAN radio gateway and communicates with the application server; and
the LoRaWAN join server is connected to the LoRaWAN network server and (i) facilitates in arriving at a common compression/decompression protocol, profile, and dictionary for the application server and (ii) assigns an IP address to the wireless device to enable the wireless device to communicate with the IP application client.

19. The application server of claim 16, wherein the application server determines a maximum segment size to enable the application server to segment relatively large IP packets into multiple, relatively small LPWAN packets.

20. The application server of claim 16, wherein the IP capabilities of the wireless device are pre-configured in a device profile and capabilities database stored in the LPWAN server.

21. The application server of claim 16, wherein the IP capabilities of the wireless device are included in a join-request message transmitted from the wireless device to the LPWAN server.

22. The application server of claim 16, wherein:
the plurality of available UL compression/decompression protocols comprises at least Robust Header Compression Protocol (RoHC) and Compression Control Protocol (CCP); and
the plurality of available DL compression/decompression protocols comprises at least RoHC and CCP.

23. A method for supporting IP communication between a wireless device and an IP application node having an IP address via a non-cellular LPWAN comprising (i) one or more LPWAN radio gateways that wirelessly communicate with the wireless device and (ii) an LPWAN server connected to the one or more LPWAN radio gateways and with the IP application node, the method comprising the LPWAN server:
(a) providing the IP address of the IP application node to the wireless device;
(b) selecting a UL compression/decompression protocol from a plurality of available UL compression/decompression protocols and assigning the selected UL compression/decompression protocol and a corresponding UL protocol profile to the wireless device to enable the wireless device to apply the UL compression/decompression protocol to a UL IP-layer header to generate a compressed UL IP-layer header for wireless transmission from the wireless device to at least one LPWAN radio gateway, wherein the compressed UL IP-layer header is subsequently decompressed to form a UL IP packet for transmission to the IP application node, wherein the LPWAN network transmits UL data from the wireless device to the IP application node; and
(c) selecting a DL compression/decompression protocol from a plurality of available DL compression/decompression protocols and assigning the selected DL compression/decompression protocol and a corresponding DL protocol profile to the wireless device to enable the wireless device to apply the DL compression/decompression protocol to decompress a compressed DL IP-layer header received via wireless transmission from at least one LPWAN radio gateway, wherein the compressed DL IP-layer header was previously generated from an uncompressed DL IP-layer header of a DL IP packet from the IP application node, wherein the LPWAN network transmits DL data from the IP application node to the wireless device, wherein:
the wireless device is capable of supporting any of the plurality of available UL compression/decompression protocols and any of the plurality of available DL compression/decompression protocols;
the LPWAN server selects both (i) the selected UL compression/decompression protocol from the plurality of available UL compression/decompression protocols and (ii) the selected DL compression/decompression protocol from the plurality of available DL compression/decompression protocols based on IP capabilities of the wireless device; and
the UL compression/decompression protocol is different from the DL compression/decompression protocol.

24. The method of claim 23, wherein:
the IP application node is an IP application client of an application server that is connected between the LPWAN server and the IP application client; and
the LPWAN server:
provides an IP address of the wireless device to the application server;
assigns the UL compression/decompression protocol to the application server to enable the application server to decompress the compressed UL IP-layer header to form the UL IP packet for transmission to the IP application client; and
assigns the DL compression/decompression protocol to the application server to enable the application server to generate the compressed DL IP-layer header from the uncompressed DL IP-layer header of the DL IP packet from the IP application node.

25. The method of claim 24, wherein:
the LPWAN network is a LoRaWAN;
each LPWAN radio gateway is a LoRaWAN radio gateway;
the LPWAN server comprises a LoRaWAN network server and a LoRaWAN join server;
the LoRaWAN network server is connected to each LoRaWAN radio gateway and communicates with the application server; and
the LoRaWAN join server is connected to the LoRaWAN network server and (i) facilitates in arriving at a common compression/decompression protocol, profile, and dictionary for the wireless device and the application server and (ii) assigns an IP address to the wireless device to enable the wireless device to communicate with the IP application client.

26. The method of claim 23, wherein the LPWAN server assigns an IP address of the wireless device to the wireless device.

27. The method of claim 23, wherein the LPWAN server enables one or more legacy wireless devices to communicate with one or more legacy application nodes.

28. The method of claim 23, wherein the IP capabilities of the wireless device are pre-configured in a device profile and capabilities database stored in the LPWAN server.

29. The method of claim 23, wherein the IP capabilities of the wireless device are included in a join-request message received by the LPWAN server from the wireless device.

30. The method of claim 23, wherein:
the plurality of available UL compression/decompression protocols comprises at least Robust Header Compression Protocol (RoHC) and Compression Control Protocol (CCP); and
the plurality of available DL compression/decompression protocols comprises at least RoHC and CCP.

31. A method for a wireless device to support IP communication between the wireless device and an IP application node having an IP address via a non-cellular LPWAN network, the method comprising the wireless device:
wirelessly communicating with the LPWAN network;
receiving assignment of a selected UL compression/decompression protocol and a corresponding UL protocol profile from an LPWAN server of the LPWAN network and applying the selected UL compression/decompression protocol and the corresponding UL protocol profile to a UL IP-layer header to generate a compressed UL IP-layer header for wireless transmission from the wireless device to the LPWAN network, wherein the compressed UL IP-layer header is subsequently decompressed to form a UL IP packet for transmission to the IP application node, wherein the wireless device transmits UL data to the IP application node via the LPWAN network; and
receiving assignment of a selected DL compression/decompression protocol and a corresponding DL protocol profile from the LPWAN server and applying the selected DL compression/decompression protocol and the corresponding DL protocol profile to decompress a compressed DL IP-layer header received via wireless transmission from the LPWAN network, wherein the compressed DL IP-layer header was previously generated from an uncompressed DL IP-layer header of a DL IP packet from the IP application node, wherein the wireless device receives DL data from the IP application node via the LPWAN network, wherein:
the wireless device is capable of supporting any of the plurality of available UL compression/decompression protocols and any of the plurality of available DL compression/decompression protocols;
the LPWAN server selects both (i) the selected UL compression/decompression protocol from the plurality of available UL compression/decompression protocols and (ii) the selected DL compression/decompression protocol from the plurality of available DL compression/decompression protocols based on IP capabilities of the wireless device; and
the UL compression/decompression protocol is different from the DL compression/decompression protocol.

32. The method of claim 31, wherein:
the LPWAN network is a LoRaWAN network comprising one or more LoRaWAN radio gateways, a LoRaWAN network server, and a LoRaWAN join server;
the IP application node is an IP application client of an application server that is connected between the LoRaWAN network server and the IP application client;
the LoRaWAN network server is connected to each LoRaWAN radio gateways and communicates with the application server; and
the LoRaWAN join server is connected to the LoRaWAN network server and (i) facilitates in arriving at a common compression/decompression protocol, profile, and dictionary for the wireless device and (ii) assigns an IP address to the wireless device to enable the wireless device to communicate with the IP application client.

33. The method of claim 31, wherein the wireless device receives assignment of an IP address of the wireless device from the LPWAN network.

34. The method of claim 31, wherein the wireless device determines a maximum segment size to enable the wireless device to segment relatively large IP packets into multiple, relatively small LPWAN packets.

35. The method of claim 31, wherein the IP capabilities of the wireless device are pre-configured in a device profile and capabilities database stored in the LPWAN server.

36. The method of claim 31, wherein the IP capabilities of the wireless device are included in a join-request message transmitted from the wireless device to the LPWAN server.

37. The method of claim 31, wherein:
the plurality of available UL compression/decompression protocols comprises at least Robust Header Compression Protocol (RoHC) and Compression Control Protocol (CCP); and
the plurality of available DL compression/decompression protocols comprises at least RoHC and CCP.

38. A method for an application server to support IP communication between a wireless device and an IP application client of the application server via a non-cellular LPWAN network, the IP application client having an IP address, wherein the method comprises the application server:
receiving a UL LPWAN packet from the LPWAN network, wherein the UL LPWAN packet comprises a compressed IP packet header;
receiving assignment of a selected UL compression/decompression protocol and a corresponding UL protocol profile from an LPWAN server of the LPWAN network and applying the selected UL compression/decompression protocol and the corresponding UL protocol profile to decompress the compressed IP packet header to generate an UL IP packet for transmission to the IP application client, wherein the IP application node receives UL data from the wireless device via the LPWAN network;
receiving a DL IP packet from the IP application client;
receiving assignment of a selected DL compression/decompression protocol and a corresponding DL protocol profile from the LPWAN server and applying the selected DL compression/decompression protocol and the corresponding DL protocol profile to an IP packet header of the downlink IP packet to generate a compressed IP packet header; and
transmitting the compressed IP packet header to the LPWAN network for wireless transmission of the compressed IP packet header to the wireless device, which applies the DL compression/decompression protocol to decompress the compressed IP packet header to recover the DL IP packet, wherein the IP application node transmits DL data to the wireless device via the LPWAN network, wherein:
the wireless device is capable of supporting any of the plurality of available UL compression/decompression protocols and any of the plurality of available DL compression/decompression protocols;
the LPWAN server selects both (i) the selected UL compression/decompression protocol from the plurality of available UL compression/decompression protocols and (ii) the selected DL compression/decompression protocol from the plurality of available DL compression/decompression protocols based on IP capabilities of the wireless device; and the UL compression/decompression protocol is different from the DL compression/decompression protocol.

39. The method of claim 38, wherein the application server receives an IP address of the wireless device from the LPWAN network.

40. The method of claim 39, wherein:

the LPWAN network is a LoRaWAN network comprising one or more LoRaWAN radio gateways, a LoRaWAN network server, and a LoRaWAN join server;

the LoRaWAN network server is connected to each LoRaWAN radio gateway and communicates with the application server; and the LoRaWAN join server is connected to the LoRaWAN network server and (i) facilitates in arriving at a common compression/decompression protocol, profile, and dictionary for the application server and (ii) assigns an IP address to the wireless device to enable the wireless device to communicate with the IP application client.

41. The method of claim 38, wherein the application server determines a maximum segment size to enable the application server to segment relatively large IP packets into multiple, relatively small LPWAN packets.

42. The method of claim 38, wherein the IP capabilities of the wireless device are pre-configured in a device profile and capabilities database stored in the LPWAN server.

43. The method of claim 38, wherein the IP capabilities of the wireless device are included in a join-request message transmitted from the wireless device to the LPWAN server.

44. The method of claim 38, wherein:

the plurality of available UL compression/decompression protocols comprises at least Robust Header Compression Protocol (RoHC) and Compression Control Protocol (CCP); and the plurality of available DL compression/decompression protocols comprises at least RoHC and CCP.

* * * * *